United States Patent
Chen et al.

(10) Patent No.: US 11,140,009 B2
(45) Date of Patent: Oct. 5, 2021

(54) FREQUENCY OFFSET ESTIMATION METHOD FOR OFDM-IM SYSTEM

(71) Applicant: SOUTH CHINA UNIVERSITY OF TECHNOLOGY, Guangdong (CN)

(72) Inventors: Fangjiong Chen, Guangdong (CN); Zhibin Yang, Guangdong (CN); Jing Liu, Guangdong (CN); Fei Ji, Guangdong (CN); Hua Yu, Guangdong (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 16/967,734

(22) PCT Filed: Oct. 30, 2018

(86) PCT No.: PCT/CN2018/112821
§ 371 (c)(1),
(2) Date: Aug. 6, 2020

(87) PCT Pub. No.: WO2019/153801
PCT Pub. Date: Aug. 15, 2019

(65) Prior Publication Data
US 2021/0044464 A1    Feb. 11, 2021

(30) Foreign Application Priority Data
Feb. 12, 2018  (CN) .......................... 201810143491.3

(51) Int. Cl.
*H04L 27/00*  (2006.01)
*H04L 5/00*  (2006.01)
*H04L 27/26*  (2006.01)

(52) U.S. Cl.
CPC .......... *H04L 27/0014* (2013.01); *H04L 5/001* (2013.01); *H04L 27/2659* (2013.01); *H04L 27/2675* (2013.01); *H04L 2027/0026* (2013.01)

(58) Field of Classification Search
CPC . H04L 5/001; H04L 27/0014; H04L 27/2659; H04L 27/2675; H04L 2027/0026
See application file for complete search history.

(56) References Cited

U.S. PATENT DOCUMENTS

| | | | |
|---|---|---|---|
| 2002/0145969 A1* | 10/2002 | Sayeed | ............... H04L 27/2676 370/206 |
| 2011/0110445 A1* | 5/2011 | Sameer | ............... H04L 27/2659 375/260 |
| 2017/0180032 A1 | 6/2017 | Basar | |

FOREIGN PATENT DOCUMENTS

| | | |
|---|---|---|
| CN | 106992848 | 7/2017 |
| CN | 107231176 | 10/2017 |
| CN | 108418772 | 8/2018 |

OTHER PUBLICATIONS

Huang, Defeng et al., "Carrier Frequency Offset Estimation for OFDM Systems Using Null Subcarriers," IEEE Transactions on Communications, vol. 54, No. 5, pp. 813-823, May 2006. (Year: 2006).*

(Continued)

*Primary Examiner* — David B Lugo
(74) *Attorney, Agent, or Firm* — JCIPRNET

(57) ABSTRACT

The invention provides a frequency offset estimation method for an OFDM-IM system. The method includes: S1. performing preliminary frequency offset compensation on a received signal subjected to non-uniform frequency offset by using a two-step method of: (1) resampling and down conversion; and (2) unified compensation for residual frequency offset ε, wherein in the step (2), a sum of energy of null sub-carriers is used as a cost function, an initial esti- (Continued)

mation value of $\varepsilon$ is obtained by one-dimensional search, and the preliminary compensation is performed; S2. estimating positions of non-activated sub-carriers in the OFDM-IM system by using the signal subjected to the preliminary compensation; and S3. assigning certain weights to the estimated sub-carriers, adding energy of the estimated sub-carriers into the cost function according to different weights, obtaining a final estimation value of $\varepsilon$ by the one-dimensional search performed on $\varepsilon$, and performing secondary compensation.

3 Claims, 2 Drawing Sheets

(56) References Cited

OTHER PUBLICATIONS

"International Search Report (Form PCT/ISA/210) of PCT/CN2018/112821", dated Jan. 18, 2019, with English translation thereof, pp. 1-4.

\* cited by examiner

FREQUENCY OFFSET ESTIMATION METHOD FOR OFDM-IM SYSTEM

CROSS-REFERENCE TO RELATED APPLICATION

This application is a 371 of international application of PCT application Ser. No. PCT/CN2018/112821, filed on Oct. 30, 2018, which claims the priority benefit of China application no. 201810143491.3, filed on Feb. 12, 2018. The entirety of each of the above mentioned patent applications is hereby incorporated by reference herein and made a part of this specification.

BACKGROUND

Technical Field

The present invention relates to the fields of OFDM, orthogonal frequency division multiplexing with index modulation, digital communication and parameter estimation, and more particularly, to a frequency offset estimation method for an OFDM-IM system.

Description of Related Art

Orthogonal Frequency Division Multiplexing (OFDM) technology is a multi-carrier modulation technology employed in many existing wireless communication systems, and is most typically represented by Wi-Fi which is a wireless local area network technology under Standard IEEE 802.11, and 4G LTE which is a fourth generation mobile communication system that has been put into commercial use. OFDM has higher spectrum efficiency and data transmission rate, and is able to effectively confront selective fading of frequency domain of a channel and a multipath effect of the channel respectively by dividing broad-band signals into a series of narrow-band signals with nearly flat fading, and adding a cyclic prefix.

The OFDM technology has the disadvantages as follows: the OFDM is sensitive to frequency offset and phase noise; a peak-to-average power ratio (PAPR) is large; a complexity of a system may be increased by a load algorithm and an adaptive modulation technology, and complexities of a transmitter and a receiver may be increased by using the load algorithm and the adaptive modulation technology.

An Orthogonal Frequency Division Multiplexing with Index Modulation (OFDM-IM) technology is a novel OFDM technology proposed in the past two years. OFDM-IM refers to an idea of a spatial modulation technology and carries a part of transmission information by using a degree of freedom of positions of activated sub-carriers, and a receiving terminal obtains this part of information by detecting the positions of the activated sub-carriers. An OFDM-IM system is better in performance than a traditional OFDM system, and a spectrum efficiency of the system can be flexibly configured by selecting different numbers of activated sub-carriers.

The sub-carriers of the OFDM-IM employed by the present invention are partially activated, which means that in addition to initially set null sub-carriers, energy of non-activated sub-carriers may also be used. Therefore, the present invention optimizes estimation of Doppler frequency shift by using the non-activated sub-carriers.

SUMMARY

An objective of the present invention is to provide a frequency offset estimation method for an OFDM-IM system. A main idea of the present invention is to improve a performance of a frequency offset estimation by using null carriers of OFDM-IM. In the present invention, a number of sub-carriers of the OFDM-IM system is N, a Multiple Phase Shift Keying (MPSK) modulation mode is used in the system, in addition to a pilot frequency, a guard interval and $N_{null}$ preset null sub-carriers, the system contains a plurality of OFDM sub-blocks, and each block has $N_{total}$ sub-carriers, wherein $N_{active}$ sub-carriers are activated sub-carriers, a position and a symbol of the pilot frequency are known, and positions of the preset null sub-carriers are known.

The frequency offset estimation method for the OFDM-IM system provided by the present invention includes the following steps.

S1. Performing preliminary frequency offset compensation on a received signal subjected to non-uniform frequency offset by using a two-step method of: 1. resampling and down conversion to obtain a discrete baseband received signal $z=\Gamma(\varepsilon)y$; and 2. unified compensation for residual frequency offset, a sum of energy of null sub-carriers being used as a cost function in the step 2:

$$J_1(\varepsilon) = \sum_{m \in S_N} |f_m^H \Gamma^H(\varepsilon)z|^2$$

wherein y is the discrete baseband received signal when the frequency offset is 0, $\varepsilon$ is a residual normalized frequency offset, $S_N$ is a null sub-carrier set, $f_m$ is an $m^{th}$ column of an inverse Fourier transformation matrix, $\Gamma(\varepsilon)$ is a frequency offset matrix diag$(1, e^{j2\pi T_c \varepsilon}, \ldots, e^{j2\pi T_c(k-1)\varepsilon})$, $j=\sqrt{-1}$, $(\cdot)^H$ is a conjugating operation, and $T_c$ is a sampling interval; and an initial estimation value $\hat{\varepsilon}_1 = \arg\min_\varepsilon J_1(\varepsilon)$ of $\varepsilon$ is obtained by one-dimensional search performed on $\varepsilon$.

S2. Using a signal $z_1$ subjected to the preliminarily estimated compensation of $\varepsilon$, with specific calculation formula:

$$z_1 = \Gamma^H(\hat{\varepsilon}_1)z;$$

and estimating positions of non-activated sub-carriers in the OFDM-IM system through the signal subjected to the frequency offset compensation, wherein sub-carriers meeting the following criteria are determined to be the non-activated sub-carriers:

① a power $P_{null}$ of the present sub-carriers is lower;
② one of two adjacent sub-carriers with a higher power $P_{side}$ is larger;
③ a specific value $P_{side}/P_{null}$ is large enough; and
at most $N_{max}$ sub-carriers meeting the above criteria are used in the following steps for the system.

S3. Sorting the estimated sub-carriers in a descending order of a size of $P_{side}$, assigning a larger weight to energy of the sub-carrier with a larger $P_{side}$, and forming the weights of each sub-carrier into a diagonal matrix W;

adding energy of the estimated sub-carriers into the cost function according to different weights, the cost function being modified as:

$$J_2(\varepsilon) = \sum_{m \in S_N} |f_m^H \Gamma^H(\varepsilon)z|^2 + \sum_{m \in \hat{S}_N} |Wf_n^H \Gamma^H(\varepsilon)z|^2$$

wherein $\hat{S}_n$ is an estimated non-activated sub-carrier set; and obtaining a final estimation value $\hat{\varepsilon}_2=\arg\min_\varepsilon J_2(\varepsilon)$ of ε by the one-dimensional search performed on ε, a signal subjected to final compensation being $Z_2=\Gamma^H(\hat{t}_2)z$ Further, in the step S2, the positions of the non-activated sub-carriers are estimated through power detection by using the signal subjected to the preliminary compensation.

Further, in the step S3, the energy of the sub-carriers estimated to be non-activated sub-carriers is added into a final cost function according to different weights.

Compared with a traditional OFDM technology, the sub-carriers of the OFDM-IM employed by the present invention are partially activated, which means that in addition to initially set null sub-carriers, the energy of the non-activated sub-carriers may also be used. Therefore, the present invention optimizes estimation of Doppler frequency shift by using the non-activated sub-carriers.

DESCRIPTION OF THE EMBODIMENTS

Figure 1:
FIG. 1 is a flow chart of a method according to the present invention.

The present invention is further described in detail hereinafter with reference to the accompanying drawings and the specific embodiments, the implementation and protection of the present invention are not limited to the accompanying drawings and the specific embodiments. It should be noted that all the processes which are not specifically described hereinafter can be implemented or understood by those skilled in the art with reference to the prior art.

The present invention provides an OFDM-IM method based on multiple modes, wherein 128 sub-carriers are provided in an OFDM-IM system, and a QPSK modulation mode is used in the system. In addition to a pilot frequency, a guard interval and 4 preset null sub-carriers, the system contains 28 OFDM sub-blocks, and each block has 4 sub-carriers, wherein 3 of the 4 sub-carriers are activated sub-carriers. A position and a symbol of the pilot frequency are known, and positions of the preset null sub-carriers are known. The specific implementation includes the following steps.

In step S1, preliminary frequency offset compensation is performed on a received signal subjected to non-uniform frequency offset by using a two-step method of: 1. resampling and down conversion to obtain a discrete baseband received signal $z=\Gamma(\varepsilon)y$; and 2. unified compensation for residual frequency offset. A sum of energy of null sub-carriers is used as a cost function in the step 2:

$$J_1(\varepsilon) = \sum_{m \in S_N} |f_m^H \Gamma^H(\varepsilon)z|^2$$

wherein y is the discrete baseband received signal when the frequency offset is 0, ε is a residual normalized frequency offset, $S_N$ is a null sub-carrier set, $f_m$ is an $m^{th}$ column of an inverse Fourier transformation matrix, $\Gamma(\varepsilon)$ is a frequency offset matrix diag$(1, e^{j2\pi T_c\varepsilon}, \ldots, e^{j2\pi T_c(k-1)\varepsilon})$, $j=\sqrt{-1}$, $(\cdot)^H$ is a conjugating operation, and $T_c$ is a sampling interval.

An initial estimation value $\hat{\varepsilon}_1=\arg\min_\varepsilon J_1(\varepsilon)$ of ε is obtained by one-dimensional search performed on ε.

In step S2, positions of non-activated sub-carriers in the OFDM-IM system are estimated by using a signal $z_1=\Gamma^H(\hat{\varepsilon}_1)z$ subjected to the preliminarily estimated compensation, with criteria that:

① a power $P_{null}$ of the present sub-carriers is lower than an average value of a power of the non-activated sub-carriers;

② one of two adjacent sub-carriers with a higher power $P_{side}$ larger than an average value of the power of the activated sub-carriers;

③ a specific value is $P_{side}/P_{null}>16$; and at most 8 sub-carriers meeting the above criteria are used in the following steps for the system.

In step S3, the estimated sub-carriers are sorted in a descending order of a size of $P_{side}$, a larger weight is assigned to energy of the sub-carrier with a larger $P_{side}$, a sub-carrier with a serial number k is $W_k=\sqrt{(9-k)/4}$, and the weights of each sub-carrier are formed into a diagonal matrix W.

Energy of the estimated sub-carriers is added into the cost function according to different weights, wherein the cost function is modified as:

$$J_2(\varepsilon) = \sum_{m \in S_N} |f_m^H \Gamma^H(\varepsilon)z|^2 + \sum_{m \in \hat{S}_N'} |Wf_n^H \Gamma^H(\varepsilon)z|^2$$

wherein $\hat{s}_{N'}$ is an estimated non-activated sub-carrier set.

A final estimation value $\hat{\varepsilon}_2=\arg\min_\varepsilon J_2(\varepsilon)$ of ε is obtained by the one-dimensional search performed on ε. A signal subjected to final compensation is $z_2=\Gamma^H(\hat{\varepsilon}_2)z$.

In step S6, Monte Carlo Simulation is performed on the above method. The following 3 situations are stimulated, as shown in Table 1.

TABLE 1

| Method | Modulation mode | Number of null carriers used for estimation |
|---|---|---|
| ① Method of Li | OFDM QPSK | 4 |
| ② Method of Li | OFDM-IM QPSK | 4 |
| ③ Method of the present invention | OFDM-IM QPSK | Initial: 4 Supplemental: not more than 8 |

Figure 2:
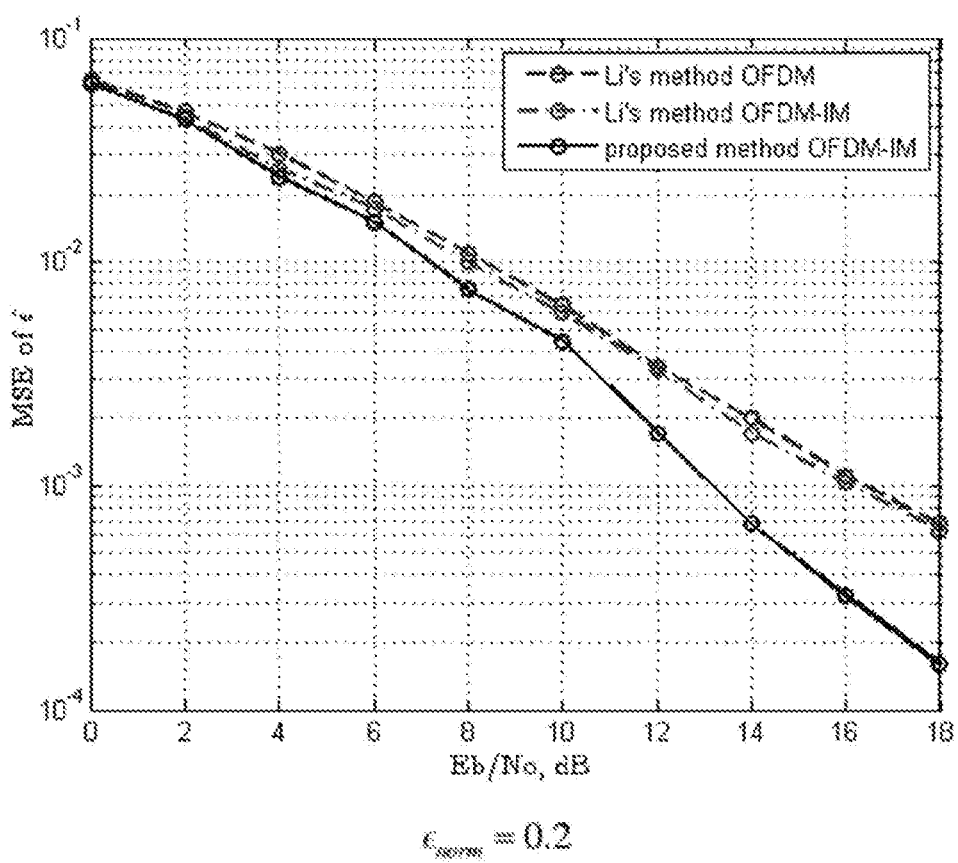
FIG. 2 and FIG. 3 are respective trend charts of mean square errors of different $\hat{\varepsilon}_{norm}$ changing with a signal-to-noise ratio.
Figure 3:
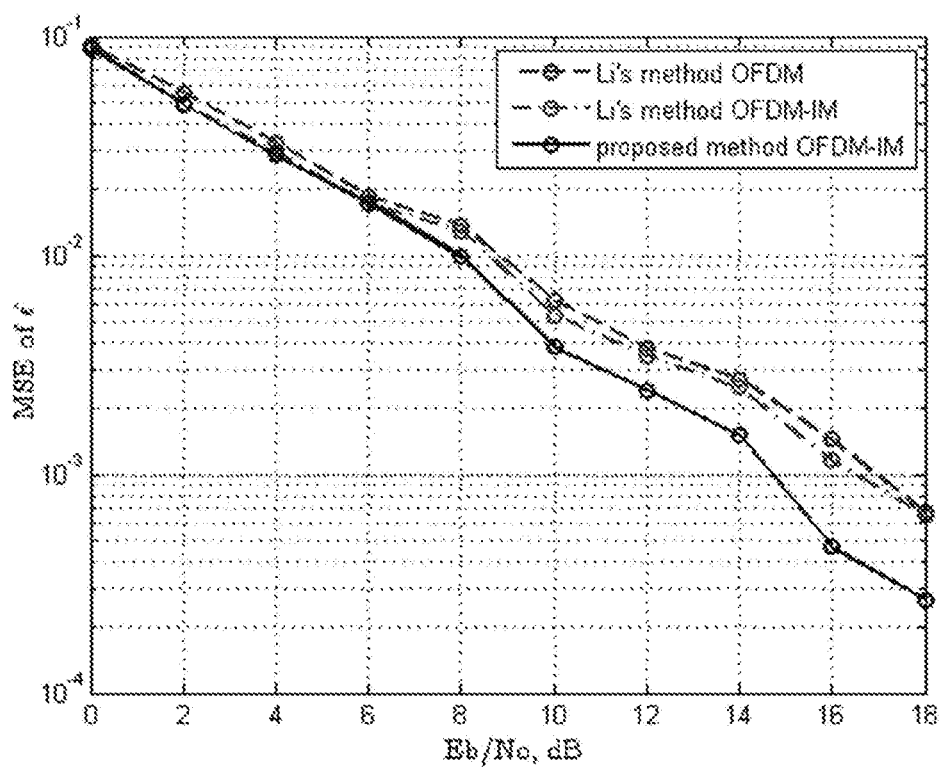

Performances of the above methods are measured in the stimulation through comparing mean square errors of an estimation value $\hat{\varepsilon}_{norm}=\hat{\varepsilon}/\Delta f$. As shown in FIG. 2 and FIG. 3, graphic symbols from top to bottom in a stimulation result diagram are trend charts of mean square errors of $\hat{\varepsilon}_{norm}$ in methods ①, ②, and ③ changing with a signal-to-noise ratio.

Stimulation results show that ② has a slightly better performance than ①, and ③ has a better performance than ① and ②. Under a high signal-to-noise ratio, ③ has a more obvious performance advantage. The stimulation results verify the effectiveness of the method according to the present invention.

The above specific embodiment is merely one implementation of the present invention, and is not used for limiting the scope of patent of the present invention. Any equivalent structure or equivalent process transformation made by using the spirit and principle of the present invention and the contents of the accompanying drawings should fall within the protection scope of patent of the present invention.

What is claimed is:

1. A frequency offset estimation method for an Orthogonal Frequency Division Multiplexing with Index Modulation (OFDM-IM) system, the method comprising following steps:

S1. performing preliminary frequency offset compensation on a received signal subjected to non-uniform frequency offset by using a two-step method of: (1) resampling and down conversion to obtain a discrete baseband received signal $z=\Gamma(\varepsilon)y$; and (2) unified compensation for residual frequency offset, a sum of energy of null sub-carriers being used as a cost function in the step (2):

$$J_1(\epsilon) = \sum_{m \in S_N} |f_m^H \Gamma^H(\epsilon)z|^2$$

wherein y is the discrete baseband received signal when the frequency offset is 0, $\varepsilon$ is a residual normalized frequency offset, $S_N$ is a null sub-carrier set, $f_m$ is an $m^{th}$ column of an inverse Fourier transformation matrix, $\Gamma(\varepsilon)$ is a frequency offset matrix diag-$(1, e^{j2\pi T_c \varepsilon}, \ldots, e^{j2\pi T_c(K-1)\varepsilon})$, $j=\sqrt{-1}$, $(\cdot)^H$ is a conjugating operation, and $T_c$ is a sampling interval; and an initial estimation value $\hat{\varepsilon}_i = \arg\min_t J_1(\varepsilon)$ of $\varepsilon$ is obtained by one-dimensional search performed on $\varepsilon$;

S2. using a signal $z_1 = \Gamma^H(\hat{\varepsilon}_1)z$ subjected to the preliminarily estimated compensation of $\varepsilon$ to estimate positions of non-activated sub-carriers in the OFDM-IM system based on the signal subjected to the compensation, with criteria that:

① a present power $P_{null}$ of the sub-carriers is lower than an average value of a power of the non-activated sub-carriers;

② one of two adjacent sub-carriers with a higher power $P_{side}$ is larger than an average value of a power of activated sub-carriers;

③ a specific value $P_{side}/P_{null}$ is larger than 16; and

S3. sorting the estimated sub-carriers in a descending order of a size of $P_{side}$, assigning a larger weight to energy of the sub-carrier with a larger $P_{side}$, and forming the weights of each sub-carrier into a diagonal matrix W;

adding energy of the estimated sub-carriers into the cost function according to different weights, the cost function being modified as:

$$J_2(\epsilon) = \sum_{m \in S_N} |f_m^H \Gamma^H(\epsilon)z|^2 + \sum_{m \in \hat{S}_N} |W f_n^H \Gamma^H(\epsilon)z|^2$$

wherein $\hat{S}_N$ is an estimated non-activated sub-carrier set; and obtaining a final estimation value of $\hat{\varepsilon}_2 = \arg\min_t J_2(\varepsilon)$ of $\varepsilon$ by the one-dimensional search performed on $\varepsilon$, a signal subjected to final compensation being $z_2 = \Gamma^H(\hat{\varepsilon}_2)z$, wherein a number of sub-carriers of the OFDM-IM system is N, a multiple phase shift keying (MPSK) modulation mode is used in the system, in addition to a pilot frequency, a guard interval and $N_{null}$ preset null sub-carriers, the system contains a active plurality of OFDM sub-blocks, and each block has $N_{total}$ sub-carriers, wherein $N_{active}$ sub-carriers are activated sub-carriers, a position and a symbol of the pilot frequency are known, and positions of the preset null sub-carriers are known.

2. The frequency offset estimation method for the OFDM-IM system according to claim 1, wherein in the step S2, the positions of the non-activated sub-carriers are estimated through power detection by using the signal subjected to the preliminary compensation.

3. The frequency offset estimation method for the OFDM-IM system according to claim 1, wherein in the step S3, the energy of the sub-carriers estimated to be non-activated is added into a final cost function according to different weights.

* * * * *